Patented Nov. 30, 1943

2,335,395

UNITED STATES PATENT OFFICE 2,335,395

PROCESS FOR THE PRODUCTION OF LEAD AND BORON FREE GLAZES

Wilhelm Diether, Kelsterbach-on-the-Main, Germany; vested in the Alien Property Custodian No Drawing. Application January 23, 1941, Serial No. 375,680. In Germany February 3, 1940

3 Claims. (Cl. 106—48)

The problem of the production of glazes which contain neither lead nor boron is very old and numerous investigations have already been made to find a satisfactory solution. But the glazes obtained could only be used at firing temperatures over 1100° C. The desire of the ceramic manufacturer, however, is directed to firing temperatures which are as low as possible, the high temperatures partly destroying the under glaze colors and partly changing the physical qualities of the fired ceramic material in a very unfavorable manner.

Now it was found that according to my invention glazes may be produced which contain neither boron nor lead and whose firing temperatures are below 1000° C. In contrast with the hitherto known methods for the production of glazes, the alkali is not added in form of sodium monoxide as the alkali in form of sodium monoxide tends to capillary cracks. In consequence thereto the alkali is added to the batch in the form of potassium monoxide in quantities of 0.4–0.8 molecule, preferably 0.5–0.7 molecule, according to the Seger formula.

Moreover, I have found that, with respect to the glazes and the low firing temperature, it is advantageous to keep the content of barium oxide as low as possible. Glazes which contain considerable amounts of barium oxide sometimes get a dull coating during the firing process in the ceramic furnaces which coating consists substantially of barium sulfate, separated out from sulphur-containing furnace gases.

A further object of my invention is seen in the increase of the silica content. Quantities of 3.5–5.0 molecules, preferably 4.0–4.5 molecules of silica, according to the Seger formula, are added. In spite of this relatively high content of silica it is possible to maintain a fusion point of the glazes which is far below all hitherto known firing temperatures for glazes free from boron and lead.

The glaze composition, i. e. the substitution of sodium monoxide by potassium oxide with a very low content of barium oxide and an increased content of silica yields glazes with final firing temperatures below 1100° C., even below 1000° C.

In carrying out my invention I proceed as follows:

A glaze of the Seger formula 0.55 molecule $K_2O$
0.10 molecule ZnO
0.15 molecule CaO  } $0.2Al_2O_3.4.2SiO_2$
0.10 molecule MgO
0.10 molecule BaO is made from the customary ceramic starting materials. After mixing, the starting materials are melted at 1300° C., the melt afterwards poured in water and the resulting frit ground with the necessary quantities of clay. The slip is, if desired, mixed with pigment for the manufacture of colored glazes, then applied to stoneware, ceramic ware of various kinds, tiles, wall plates, ceramic articles and the like and fired. A perfect glaze of satisfactory fusibility is obtained which meets all requirements.

What I claim is:

1. An improved ceramic glaze, free from compounds of lead and boron and having a firing temperature below 1100° C., which comprises from 3.6 to 5 molecules of silica, an amount of barium oxide not in excess of 0.10 molecule, and from 0.4 to 0.8 molecule of potassium oxide, said glaze being substantially free from oxides of sodium.

2. An improved ceramic glaze, free from compounds of lead and boron and having a firing temperature below 1100° C., which comprises silica in amounts ranging from 4.0 to 4.5 molecules, barium oxide in amounts not over 0.10 molecule, and potassium oxide in amounts ranging from 0.5 to 0.7 molecule, said glaze being substantially free from oxides of sodium.

3. An improved ceramic glaze having a firing temperature below 1100° C., said glaze having the following composition: 4.2 molecules of silica; 0.10 molecule of barium oxide; 0.55 molecule of potassium oxide; 0.10 molecule of zinc oxide; 0.15 molecule of calcium oxide; 0.10 molecule of magnesium oxide; and 0.2 molecule of alumina.

WILHELM DIETHER.